United States Patent [19]
Yang

[11] Patent Number: 5,753,118
[45] Date of Patent: May 19, 1998

[54] FAUCET AND FILTER ASSEMBLY

[76] Inventor: Tsai Chen Yang, P.O. Box 63-99, Taichung, Taiwan

[21] Appl. No.: 856,772

[22] Filed: May 15, 1997

Related U.S. Application Data

[63] Continuation-in-part of Ser. No. 767,419, Dec. 16, 1996, abandoned.

[51] Int. Cl.⁶ .................................................. C02F 9/00
[52] U.S. Cl. ........................... 210/266; 210/282; 210/288; 210/420; 210/424
[58] Field of Search .................... 210/266, 282, 210/288, 420, 421, 422, 423, 424, 438, 443

[56] References Cited

U.S. PATENT DOCUMENTS

| | | | |
|---|---|---|---|
| 953,637 | 3/1910 | McCollom | 210/424 |
| 966,181 | 8/1910 | Durbrow | 210/424 |
| 3,853,761 | 12/1974 | McClory | 210/420 |
| 4,147,631 | 4/1979 | Deines et al. | 210/282 |
| 4,172,796 | 10/1979 | Corder | 210/282 |
| 4,504,389 | 3/1985 | Rundzaitis | 210/266 |
| 4,686,037 | 8/1987 | Lang | 210/288 |
| 4,980,073 | 12/1990 | Woodruff | 210/424 |
| 5,277,805 | 1/1994 | Ferguson | 210/266 |

*Primary Examiner*—Ivars Cintins

[57] ABSTRACT

A faucet and filter assembly includes a faucet secured to one end of a base which has two partitions for separating the interior of the base into three spaces. A valve is threadedly engaged in the base for engaging with one of the partition and for controlling the water from one space to the other. A bolt is secured to a lower side portion of the base for securing an outlet. A filter barrel is secured to the upper side portion of the base and coupled to the outlet for filtering the water and for allowing water to flow out through the outlet.

3 Claims, 3 Drawing Sheets

FAUCET AND FILTER ASSEMBLY

The present invention is a continuation in part of the U.S. patent application Ser. No. 08/767,419 filed Dec. 16, 1996, now abandoned.

BACKGROUND OF THE INVENTION

1. Field of the Invention

The present invention relates to a faucet, and more particularly to a faucet and filter assembly.

2. Description of the Prior Art

Typical faucets comprise a base having two outlets for cold water and hot water respectively. However, filter members may not be easily attached to the typical faucets, such that typical faucets have no filter member for filtering purposes.

The present invention has arisen to mitigate and/or obviate the afore-described disadvantages of the conventional faucets.

SUMMARY OF THE INVENTION

The primary objective of the present invention is to provide a faucet including a filter member attached thereto for filtering purposes.

In accordance with one aspect of the invention, there is provided a faucet and filter assembly comprising a base including a first end portion having a faucet and including a second end portion, the base including a first partition and a second partition for separating an interior of the base into a first space and a second space and a third space, the base including an inlet communicating with the first space for allowing water to flow into the first space, the first partition including a wall parallel to the base and having an entrance, the second partition including an aperture for communicating the second space with the third space, the base including an upper side portion having a first screw hole communicating with the third space and including a lower side portion having a second screw hole communicating with the third space, a valve threadedly engaged in the base for engaging with the wall and for enclosing the entrance and for allowing water to flow from the first space into the second space when the valve is disengaged from the wall, a bolt threadedly engaged with the second screw hole and including a bore communicating with the third space, an outlet secured to the bolt, and a filter barrel threadedly engaged with the first screw hole and including a passage for allowing water to flow from the third space into the filter barrel, the filter barrel including a filter member for filtering the water and including a center portion having an opening for receiving water flowing through the filter member, the opening being communicating with the outlet for allowing water to flow out through the outlet.

A filter tube is secured to the base and engaged with the aperture of the second partition for filtering the water flowing from the second space to the third space.

A coupler is engaged in the bolt and communicating with the opening, and a nut is threadedly engaged with the bolt for securing the coupler to the bolt, the outlet is extended from the coupler for allowing water from the opening to flow out through the outlet.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
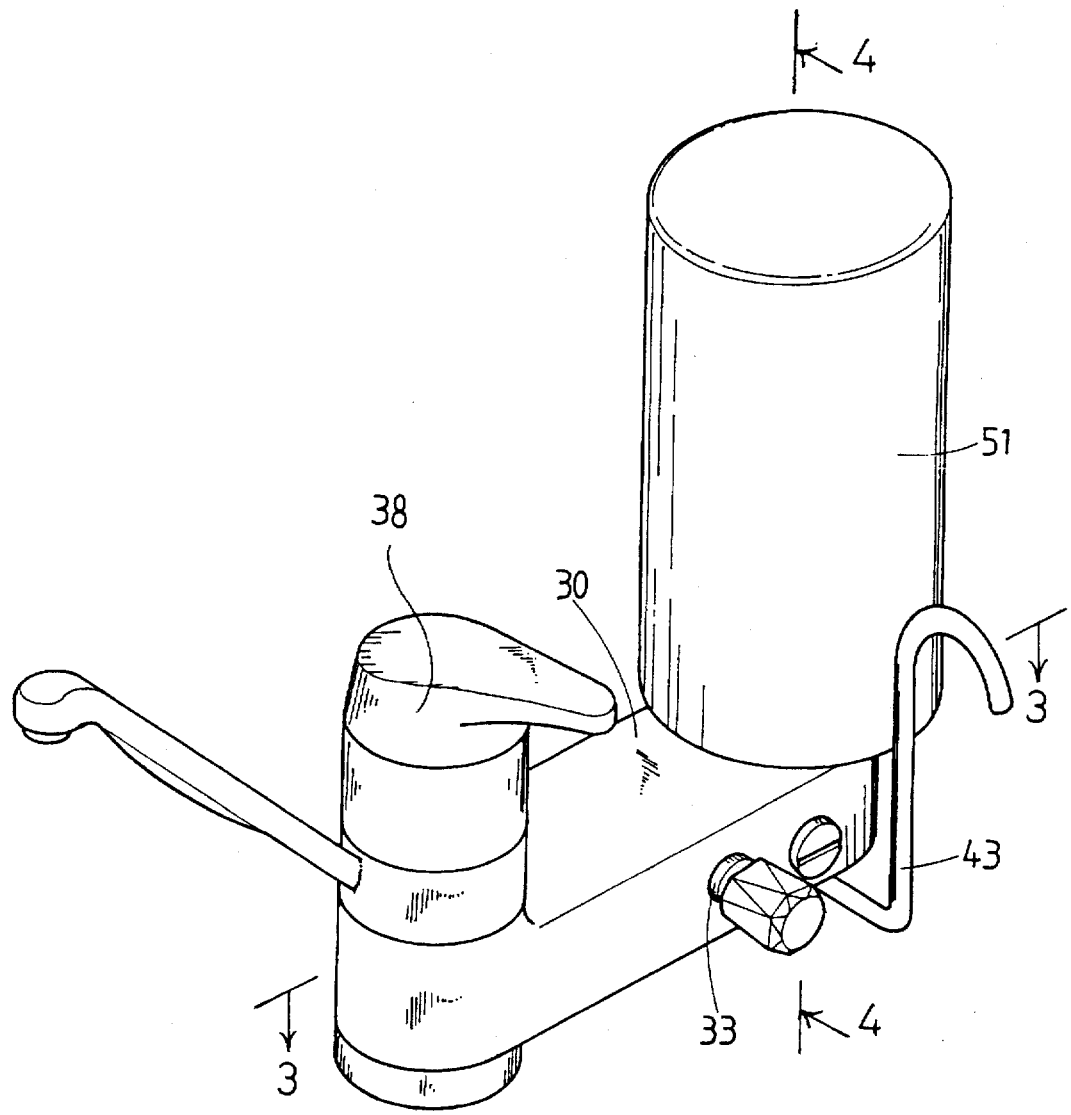
FIG. 1 is a perspective view of a faucet and filter assembly in accordance with the present invention.
Figure 2:
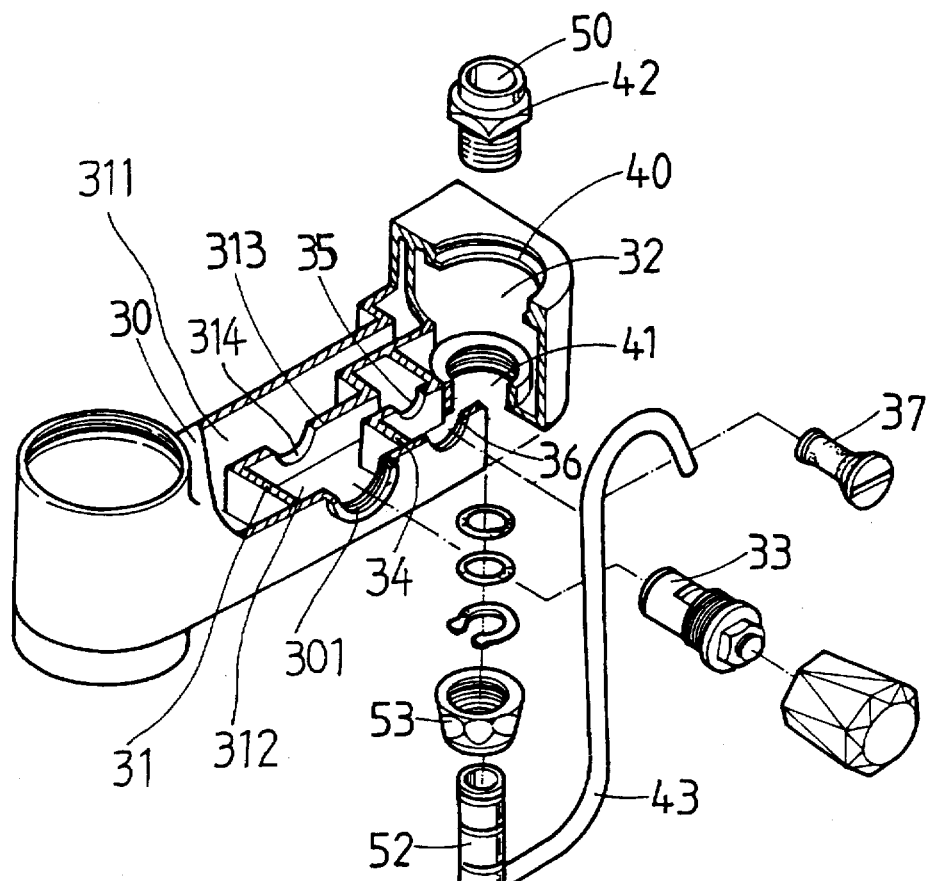
FIG. 2 is a partial exploded view of the faucet and filter assembly.
Figure 3:
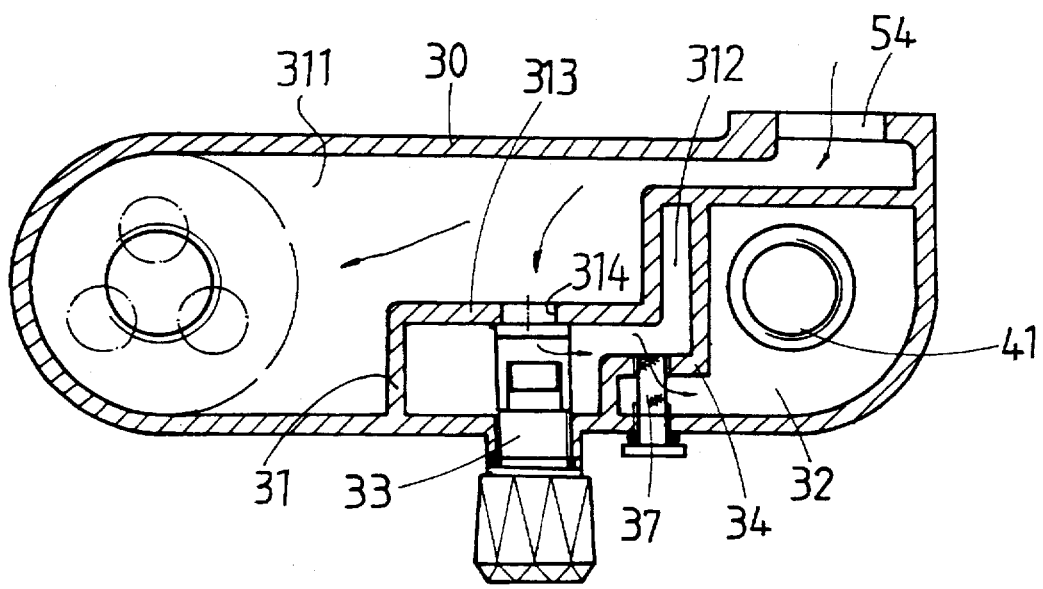
FIGS. 3 and 4 are cross sectional views taken along lines 3—3 and 4—4 of FIG. 1 respectively.

Referring to the drawings, and initially to FIGS. 1 to 3, a faucet and filter assembly in accordance with the present invention comprises a base 30 including a typical faucet 38 secured to one end portion. The base 30 includes two partitions 31, 34 for separating the interior of the base 30 into three spaces 311, 312, 32. The base 30 includes an inlet 54 for allowing water to flow into the space 311. The partition 31 includes a wall 313 arranged in parallel to the front surface of the base 30 and having an entrance 314 aligned with an orifice 301 of the base 30. The base 30 includes an inner thread formed in the inner peripheral surface for defining the orifice 301 for threadedly engaging with a valve 33 which may engage with the wall 313 of the partition 311 for enclosing the entrance 314 and which may be disengaged from the wall 313 for allowing water to flow from the space 311 into the space 312. The partition 34 includes an aperture 35 for aligning with a puncture 36 of the base 30 and for engaging with a filter tube 37 which may filter the water flowing from the space 312 to the space 32.

Figure 4:
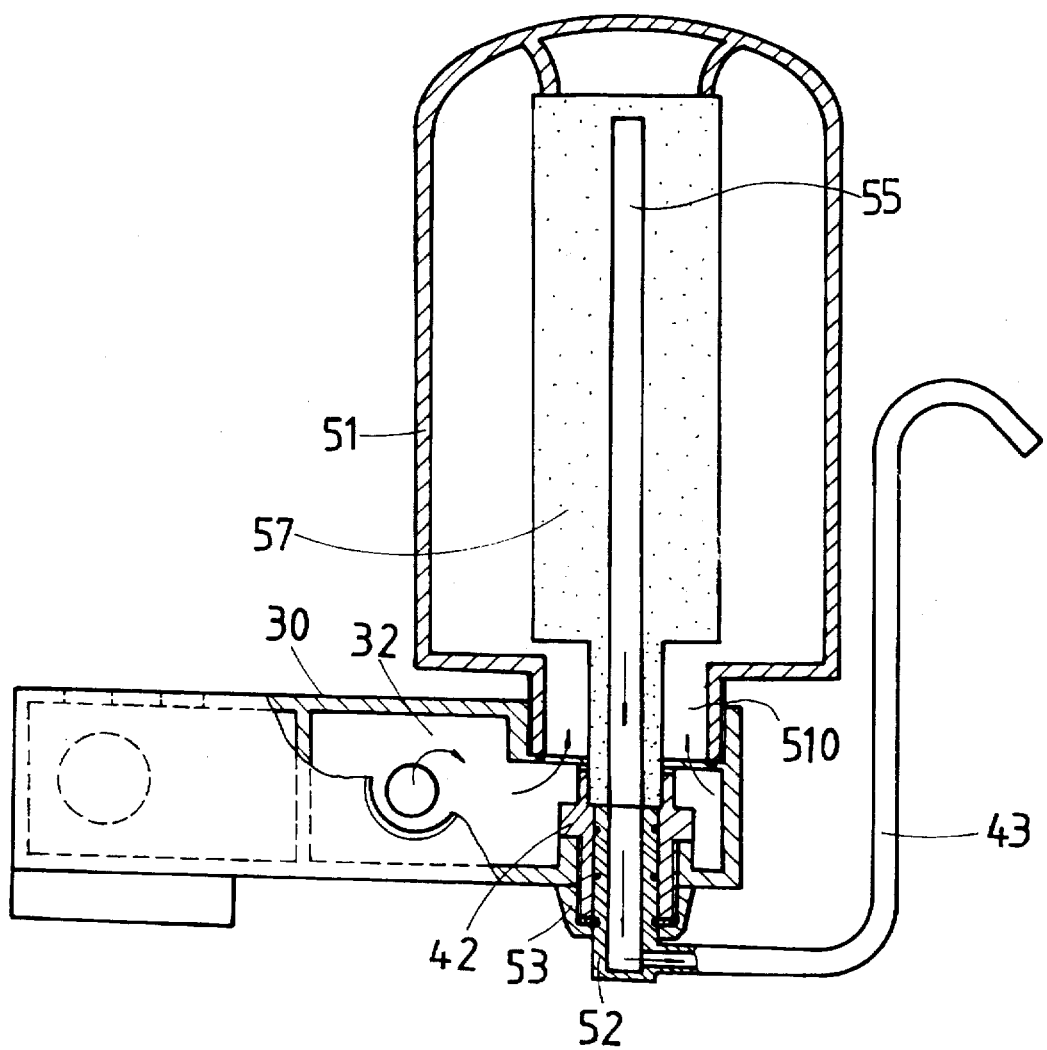

The base 30 includes a screw hole 40 formed in an upper side portion for threadedly engaging with a filter barrel 51 which includes a passage 510 (FIG. 4) for allowing water to flow from the space 32 into the filter barrel 51. The filter barrel 51 includes a filter member 57 for filtering purposes and having an opening 55 formed in the center for receiving the water filtered by the filter member 57. The filter member 57 may be selected from activated carbon, sand, zeolite, ion exchange resins, etc. The base 30 includes another screw hole 41 formed in the lower side portion for engaging with a bolt 42 which includes a bore 50 communicating with the space 32. A coupler 52 is engaged in the bolt 42 and communicating with the opening 55 and secured to the bolt 42 by a nut 53 which is threadedly engaged with the bolt 42 (FIG. 4). The coupler 52 includes an outlet 43 for allowing the filtered water from the opening 55 to flow out through the outlet 43.

Accordingly, the faucet and filter assembly in accordance with the present invention includes one or more filter members engaged in the faucet base for filtering purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A faucet and filter assembly comprising:

a base including a first end portion having a faucet and including a second end portion, said base including a first partition and a second partition for separating an interior of said base into a first space and a second space and a third space, said base including an inlet communicating with said first space for allowing water to flow into said first space, said first partition including a wall having an entrance, said second partition including an aperture for communicating said second space with said third space, said base including an upper side portion having a first screw hole communicating with said third space and including a lower side portion having a second screw hole communicating with said third space, a valve threadedly engaged in said base for engaging with said wall and for enclosing said entrance and for allowing water to flow from said first space into said second space when said valve is disengaged from said wall, a bolt threadedly engaged with said second screw hole and including a bore communicating with said third space, an outlet secured to said bolt, and a filter barrel threadedly engaged with said first screw hole and including a passage for allowing water to flow from said third space into said filter barrel, said filter barrel including a filter member for filtering the water and including a center portion having an opening for receiving water flowing through said filter member, said opening being communicating with said outlet for allowing water to flow out through said outlet.

2. A faucet and filter assembly according to claim 1 further comprising a filter tube secured to said base and engaged with said aperture of said second partition for filtering the water flowing from said second space to said third space.

3. A faucet and filter assembly according to claim 1 further comprising a coupler engaged in said bolt and communicating with said opening, and a nut threadedly engaged with said bolt for securing said coupler to said bolt, said outlet being extended from said coupler for allowing water from said opening to flow out through said outlet.

* * * * *